US012812257B2

(12) United States Patent
Kim et al.

(10) Patent No.: US 12,812,257 B2
(45) Date of Patent: Nov. 24, 2026

(54) IMAGE PROCESSING DEVICES, IMAGE PROCESSING SYSTEMS AND OPERATING METHODS THEREOF

(71) Applicant: Samsung Electronics Co., Ltd., Suwon-si (KR)

(72) Inventors: Hwanwoong Kim, Suwon-si (KR); Yunhyeok Kim, Suwon-si (KR); Hyuncheol Kim, Suwon-si (KR); Byeongjun Yoo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/923,838

(22) Filed: Oct. 23, 2024

(65) Prior Publication Data

US 2025/0184618 A1 Jun. 5, 2025

(30) Foreign Application Priority Data

Dec. 5, 2023 (KR) ........................ 10-2023-0174889

(51) Int. Cl.
*H04N 23/81* (2023.01)
*G06T 5/70* (2024.01)
*H04N 25/67* (2023.01)

(52) U.S. Cl.
CPC .................................. *H04N 23/81* (2023.01)

(58) Field of Classification Search
CPC ........... H04N 23/81; H04N 25/67; G06T 5/70
See application file for complete search history.

(56) References Cited

U.S. PATENT DOCUMENTS

| | | | | |
|---|---|---|---|---|
| 6,535,617 B1 * | 3/2003 | Hannigan | G06Q 20/341 | |
| | | | 381/94.1 | |
| 6,914,627 B1 | 7/2005 | Dong | | |
| 7,280,141 B1 | 10/2007 | Frank et al. | | |
| 7,355,638 B2 | 4/2008 | Mori | | |
| 7,477,302 B2 | 1/2009 | Hisamatsu et al. | | |
| 8,300,977 B2 | 10/2012 | Morishita | | |
| 8,400,535 B2 | 3/2013 | Nakajima | | |
| 10,417,746 B2 | 9/2019 | Murakami et al. | | |
| 11,388,361 B2 | 7/2022 | Namgung et al. | | |
| 2013/0335601 A1 | 12/2013 | Shiota et al. | | |
| 2023/0056564 A1 * | 2/2023 | Han | G06V 10/771 | |

FOREIGN PATENT DOCUMENTS

| | | |
|---|---|---|
| JP | H10-313428 A | 11/1998 |
| KR | 10-2021-0076238 A | 6/2021 |

* cited by examiner

*Primary Examiner* — Ahmed A Berhan
(74) *Attorney, Agent, or Firm* — Fish & Richardson P.C.

(57) ABSTRACT

Provided are an image processing device configured to correct fine fixed pattern noise (FPN), an image processing system, and an operating method thereof. Provided is an operating method of an image processing device, the method including receiving at least one image group including a plurality of images, detecting, from the at least one image group, fixed pattern noise (FPN) information using Fast Fourier Transform (FFT), and correcting FPN based on the FPN information.

18 Claims, 13 Drawing Sheets

20a 20b

200LSB 20avg

51a

500LSB 20avg

51b

800LSB 20avg

51c

IMAGE PROCESSING DEVICES, IMAGE PROCESSING SYSTEMS AND OPERATING METHODS THEREOF

CROSS-REFERENCE TO RELATED APPLICATION

This application is based on and claims priority under 35 U.S.C. § 119 to Korean Patent Application No. 10-2023-0174889, filed on Dec. 5, 2023, in the Korean Intellectual Property Office, the disclosure of which is incorporated by reference herein in its entirety.

BACKGROUND

The inventive concepts relate to image processing devices, and more particularly, to image processing devices, image processing systems, and operating methods thereof for correcting fine fixed pattern noise (FPN).

An image processing device such as a camera may include an image sensor that converts an image of an optical signal of an object incident through an optical lens into an image of an electrical signal, and a processor that performs image processing on the generated image.

A certain value of noise may be generated according to characteristics of the image processing device, and fixed pattern noise (FPN) may be such noise. If FPN is not corrected, a problem of image quality deterioration may occur. However, in the case of a fine FPN, it may be difficult to detect the FPN, so an image processing device and an image processing system capable of efficiently detecting and correcting the fine FPN may be advantageous.

SUMMARY

Example embodiments of the inventive concepts provide image processing devices, image processing systems, and operating methods thereof, which may correct fine fixed pattern noise (FPN) and solve the problem of image quality degradation by efficiently detecting and information-processing the fine FPN using Fast Fourier Transform (FFT).

According to some example embodiments, there is provided an operating method of an image processing device including receiving at least one image group including a plurality of images, detecting, from the at least one image group, fixed pattern noise (FPN) information using Fast Fourier Transform (FFT), and correcting FPN of an original image generated by an image sensor based on the FPN information.

According to some example embodiments, there is provided an image processing device including an image sensor configured to output image data, and an image signal processor configured to group the image data into at least one image group based on illuminance conditions, detect, from the at least one image group, fixed pattern noise (FPN) information using Fast Fourier Transform (FFT), and correct the FPN based on the FPN information.

According to some example embodiments, there is provided an image processing system including an image sensor configured to output image data, an application processor configured to group the image data into a plurality of image groups according to illuminance conditions, generate a plurality of average images corresponding to each of the plurality of image groups, measure an amplitude and phase of each of the plurality of average images using Fast Fourier Transform (FFT), detect fixed pattern noise (FPN) information based on the amplitude and phase of each of the plurality of average images, corrects FPN based on the FPN information, and a memory configured to store data.

BRIEF DESCRIPTION OF THE DRAWINGS

Example embodiments of the inventive concepts will be more clearly understood from the following detailed description taken in conjunction with the accompanying drawings in which.

DETAILED DESCRIPTION

Hereinafter, some example embodiments of the present inventive concepts will be described more fully with reference to the accompanying drawings, in which some example embodiments of the inventive concepts are shown. As those skilled in the art would realize, the described example embodiments may be modified in various different ways all, all without departing from the spirit and scope of the present inventive concepts.

Figure 1:
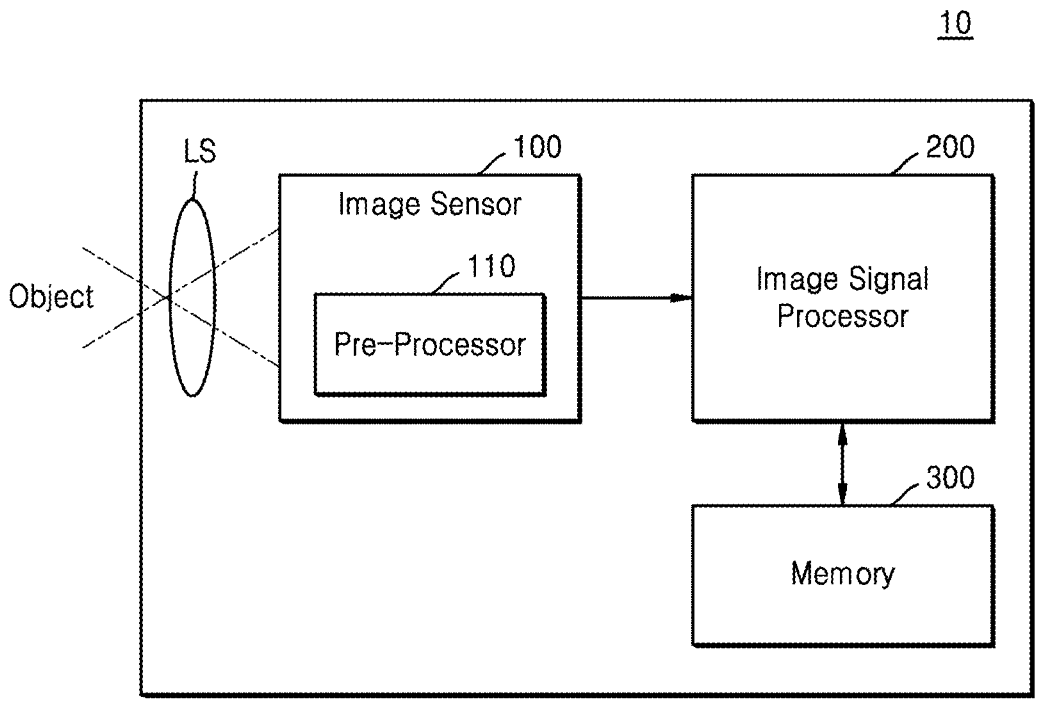
FIG. 1 is a block diagram illustrating an image processing device according to some example embodiments.
Figure 2:
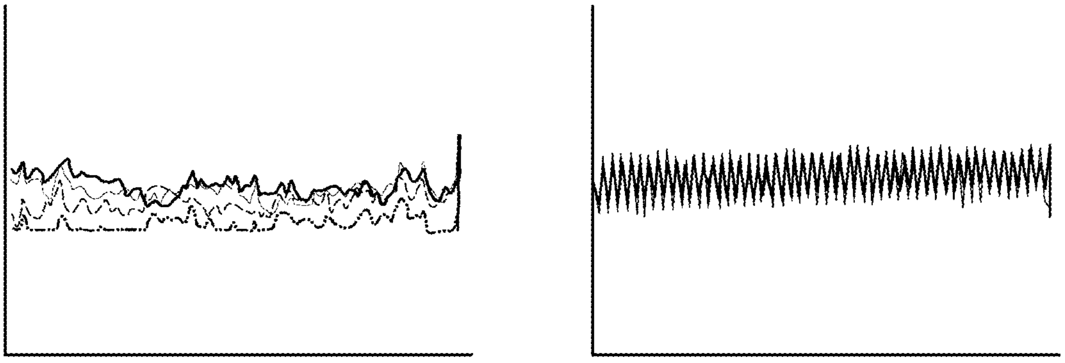
FIG. 2 illustrates graphs for describing an operation of detecting fixed pattern noise (FPN) information by using a Fast Fourier Transform (FFT) process in an image processing device according to some example embodiments.

FIG. 1 is a block diagram illustrating an image processing device according to some example embodiments. FIG. 2 illustrates graphs for describing an operation of detecting fixed pattern noise (FPN) information by using a Fast Fourier Transform (FFT) process in an image processing device according to some example embodiments.

An image processing device 10 may be embedded in an electronic device or may be implemented as an electronic device. Electronic devices are devices that capture images, display captured images, or perform operations based on captured images, for example, may include electronic devices, such as digital cameras, smartphones, wearable devices, Internet of Things (IoT) devices, personal computers, tablet personal computers (PC), personal digital assistants (PDA), portable multimedia players (PMP), navigation devices, drones, etc., or may be mounted on electronic devices equipped as components in vehicles, medical devices, furniture, manufacturing facilities, security devices, doors, various measuring devices, and the like.

Referring to FIG. 1, the image processing device 10 may include an image sensor 100, an image signal processor (ISP) 200, and a memory 300. The image processing device 10 may further include other components such as a display and a user interface (not shown). The image sensor 100 may include a pre-processor 110. The pre-processor 110 may perform image signal processing such as binning, re-mosaic, bad pixel correction, or the like.

The image sensor 100 may convert an optical signal of an object incident through an optical lens LS into an electrical signal and may generate an image (or referred to as image data, hereinafter referred to as an image) based on the electrical signal. The image sensor 100 may generate a plurality of images by varying an illuminance condition for the same object and may transmit the generated plurality of images to the ISP 200. In some example embodiments, the illuminance condition may be an illuminance at regular intervals. For example, the image sensor 100 may generate a plurality of images by capturing an object at a first illuminance, may generate a plurality of images by capturing the object at a second illuminance, and may generate a plurality of images by capturing the object at a third illuminance. The first illuminance may have a value less than the second illuminance, the second illuminance may have a value less than the third illuminance, and the difference value between the second illuminance and the first illuminance may be the same as the difference value between the third illuminance and the second illuminance. The image sensor 100 may transmit a plurality of images to the ISP 200.

The ISP 200 may perform image processing on the received image group or image. For example, image processing may include various processes, including, but not limited to, processing for improving image quality, such as noise removal, brightness adjustment, sharpness adjustment, etc., image processing, such as image size change, data format change (e.g., changing image data of a Bayer pattern to YUV or RGB format), and the like.

In some example embodiments, the ISP 200 may receive a plurality of images from the image sensor 100 and may group the received plurality of images based on illuminance conditions. For example, the ISP 200 may group the plurality of images captured at a first illuminance into a first image group, group a plurality of images captured at a second illuminance into a second image group, and group a plurality of images captured at a third illuminance into a third image group.

Alternatively, in some example embodiments, the ISP 200 may receive a plurality of image groups from the image sensor 100. For example, the image sensor 100 may group a plurality of images generated by varying illuminance conditions and transmit, provide, or send the grouped images to the ISP 200. The image sensor 100 may group the plurality of images captured at a first illuminance into a first image group, group a plurality of images captured at a second illuminance into a second image group, and group a plurality of images captured at a third illuminance into a third image group. The image sensor 100 may transmit, provide, or send the first to third image groups to the ISP 200.

In some example embodiments, from at least one image group (e.g., from at least one of a first image group, second image group, third image group, etc.), the ISP 200 may detect FPN information using Fast Fourier Transform (FFT) operations. FFT may be an efficient algorithm that quickly performs Discrete Fourier Transform and its inverse transform. The FPN information may include a period of the FPN, a start point of the FPN, and a least significant bit (LSB) slope of the FPN. An example in which the ISP 200 detects FPN information using FFT according to some example embodiments will be described later with reference to FIG. 4.

In some example embodiments, a certain value of noise may be generated according to characteristics of the image processing device 10, and FPN may be such noise. For example, when an object is captured in an illuminance situation, the FPN may periodically appear as a line in an image. For example, the illuminance situation may be a situation in which there is light. For example, the illuminance in the illuminance situation may have a value equal to or greater than 1 LSB. For example, the FPN may appear as a column line or a row line and may appear periodically.

According to some example embodiment, if the FPN is not corrected, a problem of deteriorating image quality may occur. In order to correct FPN to solve a problem of deteriorating image quality, a process of detecting a period of the FPN and a start point of the FPN may be advantageous. Referring to FIG. 2, in some example embodiments, a graph 20*a* may be an example in which there are several FPN periods for an image generated by averaging pixel values of a plurality of images captured at the same illuminance for each column line, and a graph 20*b* may be an example in which there is one FPN period for an image generated by averaging pixel values of a plurality of images captured at the same illuminance for each column line. As may be seen from the graph 20*a* and the graph 20*b*, it may be difficult to visually grasp the period of the FPN or the period start point of the FPN even though the FPN has periodicity.

In some example embodiments, from the at least one image group, the ISP 200 according to some example embodiments may detect FPN information including a period of the FPN, a start point of the FPN, and an LSB slope of the FPN using FFT, so that FPN correction may be performed based on the detected FPN information even for the FPN that is difficult to grasp with the naked eye. Accordingly, it is possible to solve the problem of image quality deterioration. Example embodiments in which the ISP 200 uses the FFT to detect FPN information including the period of the FPN, the start point of the FPN, and the LSB slope of the FPN will be described later with reference to FIGS. 5A and 5B.

The ISP 200 may correct the FPN based on the FPN information. In some example embodiments, the ISP 200 may generate a virtual image based on the FPN information and may correct the FPN by subtracting the virtual image from an original image captured by the image sensor 100. The original image may be an image before the FPN is corrected.

The memory 300 may be a storage location for storing data. The memory 300 may receive and store FPN information from the ISP 200. The memory 300 may transmit, provide, or send the stored FPN information to the ISP 200. In some example embodiments, the memory 300 may store FPN information so as to correspond to a column line or a row line. Example embodiments of this will be described later with reference to FIG. 7. In some example embodiments, the memory 300 may store other data, for example, an operating system (OS), various programs, and a variety of data (for example, compressed data CDT), but example embodiments are not limited thereto. The memory 300 may include a volatile memory such as dynamic random-access memory (DRAM), static RAM (SRAM), or a nonvolatile memory such as phase change RAM (PRAM), resistive RAM (ReRAM), and magnetic RAM (MRAM) flash memory. Although the memory 300 is illustrated as being located outside of the ISP 200 in FIG. 1, the present inventive concepts are not limited thereto, and the memory 300 may be provided, or located, inside the ISP 200.

Figure 3:
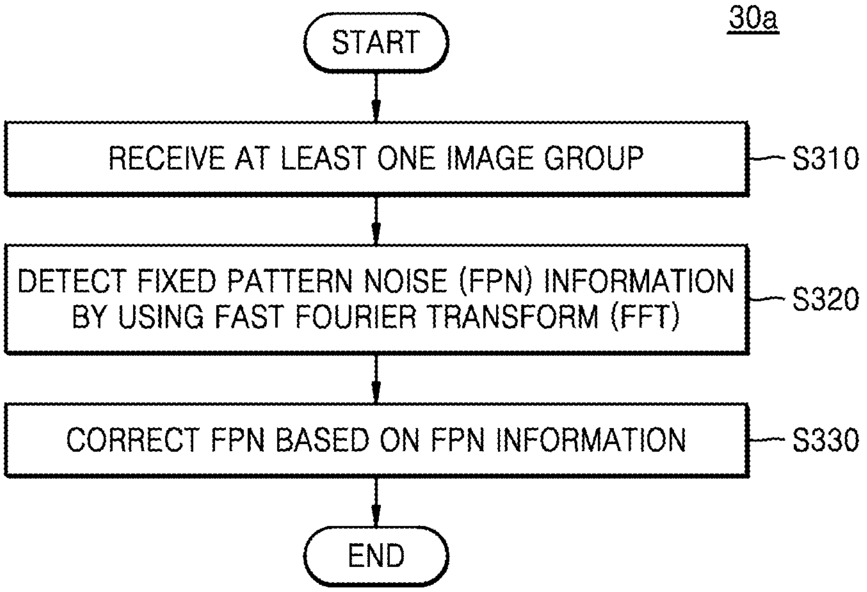
FIG. 3 is a flowchart illustrating an operating method of an image processing device, according to some example embodiments.

FIG. 3 is a flowchart illustrating an operating method of an image processing device, according to some example embodiments. As shown in FIG. 3, an operating method 30*a* of an image processing device may include a plurality of operations S310 to S330.

As those of ordinary skill in the art would realize, the sequence of operations or steps are not limited to the order presented in the claims or figures unless specifically indicated otherwise. In some example embodiments, the order of operations or steps may be changed, several operations or steps may be merged, a certain operation or step may be divided, and a specific operation or step may not be performed.

Referring to FIGS. 1 and 3, in operation S310, the ISP 200 may receive at least one image group. In some example embodiments, the image sensor 100 may generate a plurality of images by capturing an object at illuminances at regular intervals and may generate a plurality of image groups by grouping a plurality of images captured at the same illuminance into one group. The ISP 200 may receive a plurality of image groups captured at illuminances at regular intervals from the image sensor 100.

In operation S320, the ISP 200 may detect the FPN information using FFT. In some example embodiments, the ISP 200 may detect FPN information using FFT based on the plurality of image groups captured at illuminances at regular intervals. The FPN information may include a period of the FPN, a start point of the FPN, and an LSB slope of the FPN. Example embodiments in which the ISP 200 detects FPN information using FFT will be described later with reference to FIG. 4. In some example embodiments, the ISP 200 may transmit, provide, or send the detected FPN information to the memory 300, and the memory 300 may store the received FPN information.

In operation S330, the ISP 200 may correct the FPN based on the FPN information. In some example embodiments, the ISP 200 may receive FPN information stored in the memory 300 and may generate a virtual image based on the received FPN information. The ISP 200 may correct the FPN by subtracting the virtual image from the original image captured by the image sensor 100.

The image processing device 10 may detect FPN information that may occur in illuminance situations by performing the operating method 30*a* of an image processing device, and may correct the FPN based on the FPN information, thereby generating an image from which noise is removed even for FPN that is difficult to grasp with the naked eye. Accordingly, it is possible to solve the problem of image quality deterioration due to the FPN.

Figure 4:
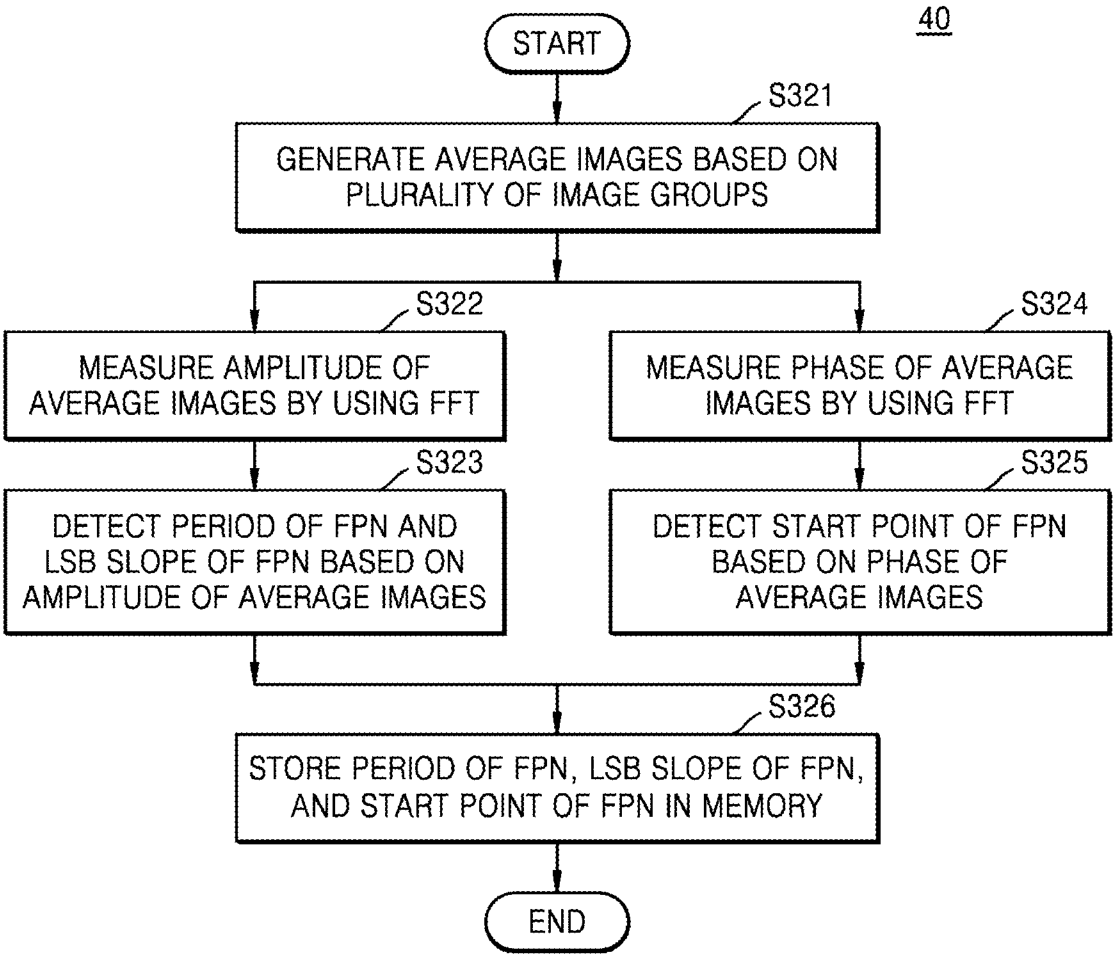
FIG. 4 is a flowchart illustrating an operating method of detecting FPN information using FFT in an image processing device according to some example embodiments.

FIG. 4 is a flowchart illustrating an operating method of detecting FPN information using FFT in an image processing device according to some example embodiments. As shown in FIG. 4, an operating method 40 of detecting FPN information using FFT in an image processing device may include a plurality of operations S321 to S326. The operating method 40 may be an example of operation S320 of FIG. 3.

Referring to FIGS. 1 and 4, in operation S321, average images may be generated based on a plurality of image groups. In some example embodiments, the ISP 200 may generate average images based on the plurality of image groups received from the image sensor 100. Each of the plurality of image groups may include a plurality of images captured at the same illuminance. For example, the ISP 200 may generate average images corresponding to each of the plurality of image groups by calculating average values of pixel values of the plurality of images captured at the same illuminance. For example, the ISP 200 may generate average images corresponding to each of the plurality of image groups by calculating average values of column line pixel values of the plurality of images captured at the same illuminance. The column line pixel value may refer to pixel values present in the same column. For example, the ISP 200 may generate average images corresponding to each of the plurality of image groups by calculating average values of row line pixel values of the plurality of images captured at the same illuminance. The row line pixel value may refer to pixel values present in the same row.

In some example embodiments, when an object is captured in an illuminance situation, the FPN may periodically appear as a line in an image. For example, the FPN may appear periodically as a column line or a row line. In an example of a line in which FPN occurs, pixels in the corresponding line may have pixel values different from a normal pixel value and may have different pixel values. For example, if the normal pixel value is 400 LSB, the pixel value of pixels in the corresponding line may be any one of 401 LSB, 402 LSB, and 403 LSB. In some example embodiments, when FFT is used for the average image by generating the average image as the average value of the pixel values of the corresponding line than when the FFT is used in operation S322 or S324 for different pixel values, the amount of computations required to measure the amplitude of the average images may be reduced.

In operation S322, the amplitude of the average images may be measured using FFT. In some example embodiments, the ISP 200 may measure the amplitude using the FFT for each of the average images corresponding to each of the plurality of image groups.

In operation S323, the period of the FPN may be detected based on the amplitude of the average images. In some example embodiments, the ISP 200 may detect a frequency at which the amplitude of the average images is measured and may detect the period of the FPN based on the detected frequency. For example, if the FPN occurs periodically as a line in the image, the ISP 200 may detect the period of the FPN based on Equation 1 below.

$$T=N/f \qquad \text{[Equation 1]}$$

T may be a period of the column line-type FPN or a period of the row line-type FPN, N may be the number of columns or rows of an image, and f may be a frequency at which the amplitude of the average images is measured. In some example embodiments, when FPN does not occur, no amplitude of the average images may be measured, so the frequency may not be detected, and, in some example embodiments, when FPN occurs, an amplitude is measured, so that the frequency may be detected. For example, if the number of columns of the image is 8000 and the frequency detected by the ISP 200 is 4000 Hz, the period of the column line-type FPN may be two (2).

In operation S323, the LSB slope of the FPN may be detected based on the amplitude of the average images. In some example embodiments, the ISP 200 may detect a frequency at which an amplitude is measured for each average image and may detect an LSB slope of the FPN based on the detected frequency. For example, the ISP 200 may calculate an amplitude value corresponding to the detected frequency using FFT, and the amplitude value may tend to increase in proportion to an illuminance in which the image group is captured. Therefore, it is possible to detect the frequency at which the amplitude is measured for each average image corresponding to the plurality of image groups captured at regular intervals and to detect the LSB slope of the FPN based on the amplitude value corresponding to the detected frequency and the captured illuminance. Example embodiments of this will be described later with reference to FIG. 5B.

In operation S324, phases of average images may be measured using FFT. In some example embodiments, the ISP 200 may measure the phase using the FFT for each of the average images corresponding to each of the plurality of image groups.

In operation S325, a start point of the FPN may be detected based on the phases of the average images. In some example embodiments, the ISP 200 may detect a frequency at which the phase of the average images is measured and may detect the start point of the FPN based on the detected frequency. For example, if FPN does not occur, no frequency may be detected, and if FPN does occur, a frequency may be detected. The ISP 200 may calculate a phase value corresponding to the detected frequency using the FFT and detect a start point of the FPN based on the phase value.

In operation S326, the period of the FPN, the LSB slope of the FPN, and the start point of the FPN may be stored in the memory 300. In some example embodiments, the ISP 200 may store, in the memory 300, the period of the FPN, the LSB slope of the FPN, and the start point of the FPN detected in operations S323 and S325. For example, when the detected FPN is column line-type FPN, the ISP 200 may store, in the memory 300, the period of the FPN, the LSB slope of the FPN, and the start point of the FPN, which are detected in response to the number of columns in the image. For example, when the detected FPN is row line-type FPN, the ISP 200 may store, in the memory 300, the period of the FPN, the LSB slope of the FPN, and the start point of the FPN, which are detected in response to the number of rows in the image.

Figure 5A:
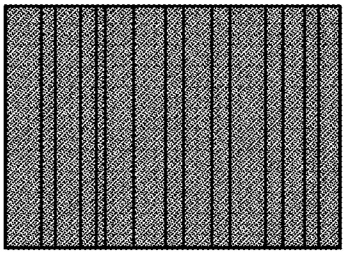
FIGS. 5A and 5B are diagrams and graphs illustrating an example of an operation of detecting FPN information using FFT in an image processing device according to some example embodiments.
Figure 5A:
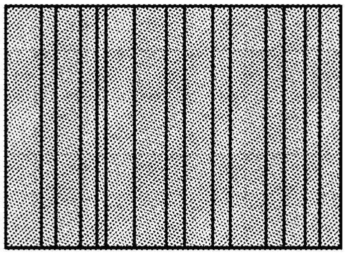
Figure 5A:
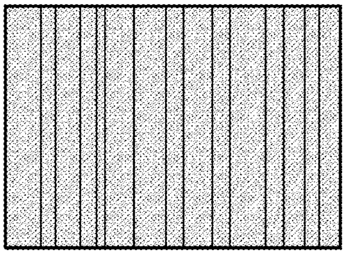
Figure 5B:
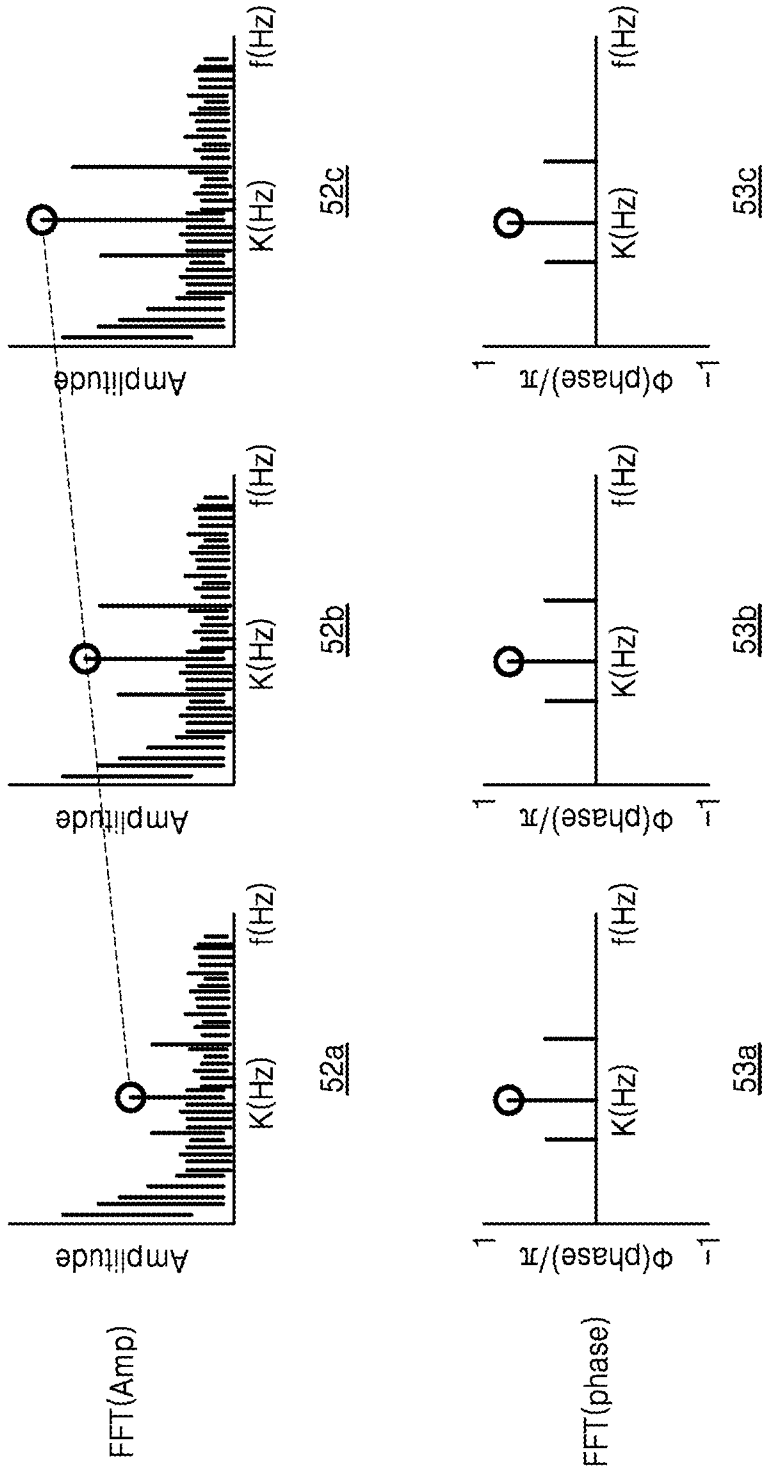

FIGS. 5A and 5B are diagrams and graphs illustrating an example of an operation of detecting FPN information using FFT in an image processing device according to some example embodiments.

Referring to FIGS. 1 and 5A, FIG. 5A may be diagrams and graphs illustrating an example in which the image processing device 10 generates a plurality of images by varying illuminance conditions for the same object and generates average images 51*a*, 51*b* and 51*c* based on the illuminance conditions and the plurality of images.

In some example embodiments, the illuminance condition may be an illuminance at regular intervals. The image processing device 10 may generate a plurality of images by capturing an object at a first illuminance and may generate a first average image 51*a* based on the plurality of images. The image processing device 10 may generate a plurality of images by capturing an object at a second illuminance and may generate a second average image 51*b* based on the plurality of images. The image processing device 10 may generate a plurality of images by capturing an object at a third illuminance and may generate a third average image 51*c* based on the plurality of images.

For example, the first illuminance may be 200 LSB, the second illuminance may be 500 LSB, and the third illuminance may be 800 LSB. The image processing device 10 may generate 20 images by capturing an object at each of the first to third illuminances. The image processing device 10 may generate a first average image 51*a* by calculating an average value of column line pixel values of 20 images captured at the first illuminance. The image processing device 10 may generate a second average image 51*b* by calculating an average value of column line pixel values of 20 images captured at the second illuminance. The image processing device 10 may generate a third average image 51*c* by calculating an average value of column line pixel values of 20 images captured at the third illuminance. The column line pixel value may refer to pixel values present in the same column.

Referring further to FIG. 5B, FIG. 5B shows a method of measuring an amplitude Amp and a phase using FFT on the average images 51*a*, 51*b*, and 51*c* generated by the image processing device 10 illustrated in FIG. 5A. The image processing device 10 may detect FPN information including a period of the FPN, an LSB slope of the FPN, and a start point of the FPN based on the measured amplitude Amp and phase. The graph of FIG. 5B may be a graph obtained by FFT-transforming the average images 51*a*, 51*b*, and 51*c*.

In some example embodiments, the image processing device 10 may measure the amplitude Amp using FFT on the average images 51*a*, 51*b*, and 51*c*. The graph 52*a* may be a graph showing the amplitude Amp of the first average image 51*a*, the graph 52*b* may be a graph showing the amplitude Amp of the second average image 51*b*, and the graph 52*c* may be a graph showing the amplitude Amp of the third average image 51*c*. The horizontal axis of each of the graphs 52*a*, 52*b*, and 52*c* may represent a frequency f (Hz) and the vertical axis thereof may represent an amplitude. For example, the horizontal axis of each of the graphs 52*a*, 52*b*, and 52*c* may represent a frequency f in hertz (Hz).

In some example embodiments, the image processing device 10 may detect a period of the FPN based on the amplitude Amp of each of the average images 51*a*, 51*b*, and 51*c*. For example, if FPN occurs periodically as a column line in an image, an amplitude may be measured at frequency K (Hz). In some example embodiments, when the number of columns of an image is N, a period of the column line-type FPN may be N/K.

In some example embodiments, the image processing device 10 may detect an LSB slope of the FPN based on the amplitude Amp of each of the average images 51*a*, 51*b*, and 51*c*. The amplitudes Amp of the average images 51*a*, 51*b*, and 51*c* may have a tendency to increase in proportion to illuminance. For example, the amplitude of the first average image 51*a* at frequency K (Hz) may be 201 LSB, the amplitude of the second average image 51*b* at frequency K (Hz) may be 502.5 LSB, and the amplitude of the third average image 51*c* at frequency K (Hz) may be 804 LSB. Since the amplitudes Amp of the average images 51*a*, 51*b*, and 51*c* increase in proportion to the illuminance, the LSB slope of the FPN may be detected by applying Equation 2 below based on two average images of the average images 51*a*, 51*b*, and 51*c*.

$$a=\{(A2-L2)-(A1-L1)\}/(L2-L1) \quad \text{[Equation 2]}$$

For example, a may be an LSB slope of the FPN, A2 may be an amplitude having a larger value of the amplitudes of two average images among the average images 51*a*, 51*b*, and 51*c*, A1 may be an amplitude having a smaller value of the amplitudes of two average images among the average images 51*a*, 51*b*, and 51*c*, L2 may be an illuminance having a larger value of the captured illuminance of two average images among the average images 51*a*, 51*b*, and 51*c*, and L1 may be an illuminance having a smaller value of the captured illuminances of two average images among the average images 51*a*, 51*b*, and 51*c*. When an LSB slope of the FPN is obtained by applying Equation 2 based on the first average image 51*a* and the second average image 51*b*, the LSB slope of the FPN may be 0.005.

In some example embodiments, the image processing device 10 may measure the phase using FFT on the average images 51*a*, 51*b*, and 51*c*. The graph 53*a* may be a graph showing the phase of the first average image 51*a*, the graph 53*b* may be a graph showing the phase of the second average image 51*b*, and the graph 53*c* may be a graph showing the phase of the third average image 51*c*. The horizontal axis of each of the graphs 53*a*, 53*b*, and 53*c* may represent a frequency f (HZ) and the vertical axis thereof may represent a phase (Phase)/π. The phase (Phase)/π may have a value of −1 to 1.

In some example embodiments, the image processing device 10 may detect a frequency at which the phase (Phase)/π of the average images 51*a*, 51*b*, and 51*c* is measured and may detect a start point of the FPN based on the detected frequency. For example, the phase (Phase)/π may be measured at frequency K (Hz), and the start point of the FPN may be detected based on the phase (Phase)/π.

Figure 6:
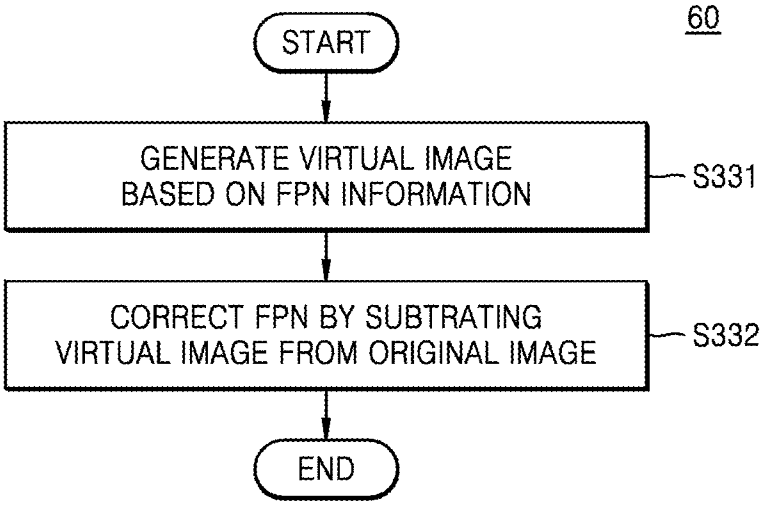
FIG. 6 is a flowchart illustrating a method of performing an FPN correction operation in an image processing device according to some example embodiments.

FIG. 6 is a flowchart illustrating a method of performing an FPN correction operation in an image processing device according to some example embodiments. As shown in FIG. 6, an FPN correction operating method 60 of the image processing device may include a plurality of operations S331 to S332. The operating method 60 may be an example of operation S330 of FIG. 3.

Referring to FIGS. 1 and 6, in operation S331, a virtual image may be generated based on FPN information. The ISP 200 may receive FPN information stored in the memory 300 and may generate a virtual image based on the received FPN information. For example, the memory 300 may store FPN information corresponding to a column line or a row line and may transmit the FPN information to the ISP 200. The ISP 200 may generate a virtual image having the same size as the original image based on FPN information corresponding to a column line or a row line. An example of this operation will be described later with reference to FIG. 7.

In operation S332, the FPN may be corrected by subtracting the virtual image from the original image. In some example embodiments, the ISP 200 may generate an image obtained by correcting the FPN by subtracting the virtual image generated in operation S331 from the original image. For example, the ISP 200 may generate an image in which the FPN is corrected by subtracting the value of each of the pixels of the corresponding virtual image from each of the pixels of the original image. An example of this operation will be described later with reference to FIG. 8.

Figure 7:
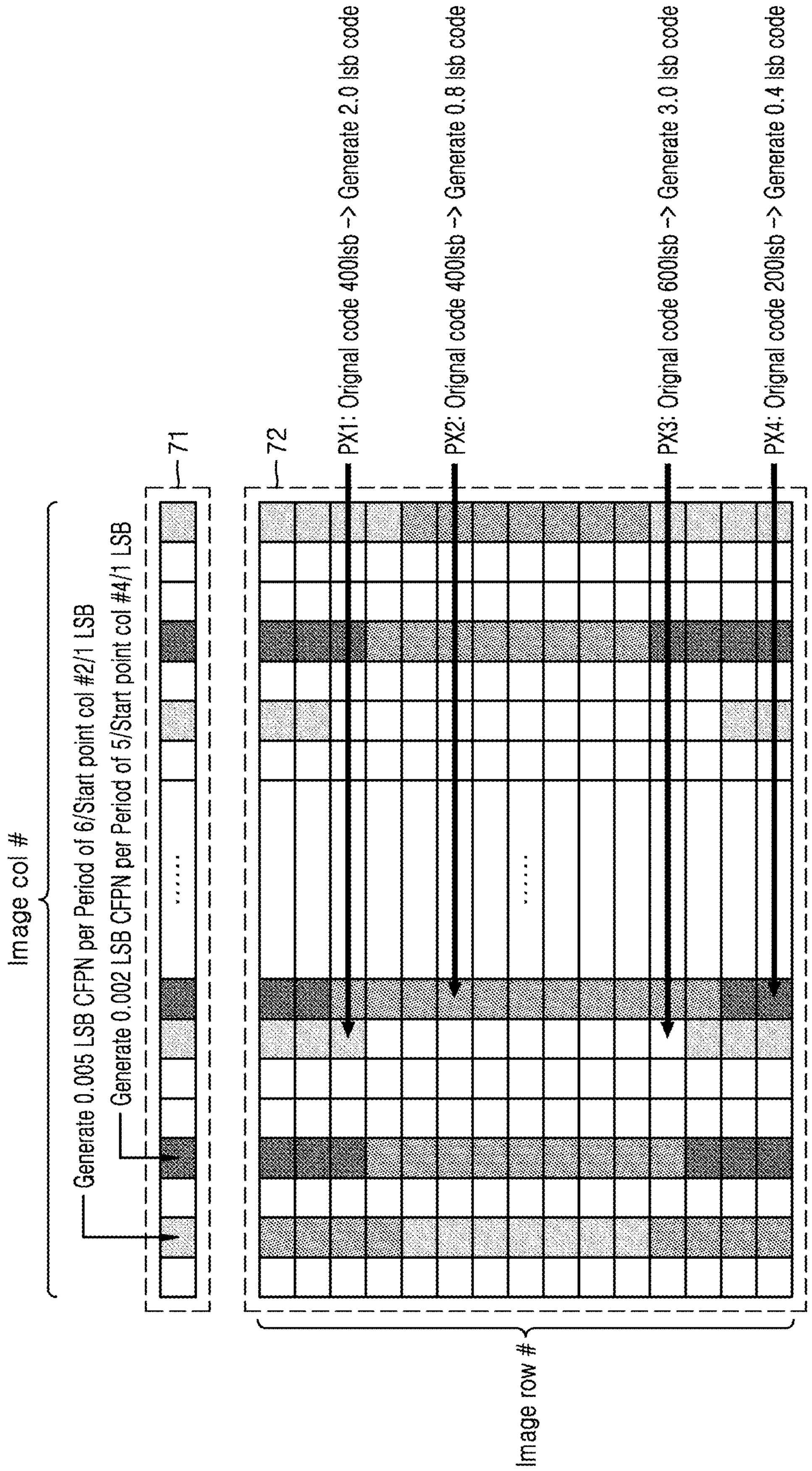
FIG. 7 is a diagram for explaining a virtual image generation process in an image processing device according to some example embodiments.

FIG. 7 is a diagram for explaining a virtual image generation process in an image processing device according to some example embodiments.

Referring to FIGS. 1 and 7, FPN information 71 may be column FPN information stored in the memory 300 to correspond to the number of column lines ("Image col #" illustrated in FIG. 7). In some example embodiments, FPN may appear periodically as a column line in an image. From the at least one image group, the image processing device 10 may detect FPN information including a period of FPN, a start point of the FPN, and an LSB slope of the FPN using FFT. The image processing device 10 may store the detected FPN information in the memory 300 to correspond to the number of column lines (Image col #).

For example, from the first image group, the image processing device 10 may detect FPN information using FFT. For example, as illustrated in FIG. 7, the period of the FPN may be a period of six, the LSB slope of the FPN may be 0.005 LSB, and the start point of the FPN may be the second column (col #2). The image processing device 10 may correspond to the detected FPN information in a column every six periods (e.g., color #2, color #8, color #14, etc.) from the second column (col #2) corresponding to the start point of the FPN. From the second image group, the image processing device 10 may detect FPN information using FFT. For example, as illustrated in FIG. 7, the period of the FPN may be a period of five, the LSB slope of the FPN may be 0.002 LSB, and the start point of the FPN may be the fourth column (col #4). The image processing device 10 may correspond to the detected FPN information in a column every five periods (e.g., color #4, color #9, color #13, etc.) from the fourth column (col #4) corresponding to the start point of the FPN. Since FPN is column FPN (CFPN) that periodically appears as a column line in an image, the image processing device 10 may store the detected FPN information 71 in the memory 300 to correspond to the number of column lines (Image col #).

A virtual image 72 may be an image for FPN correction generated based on the FPN information 71. In some example embodiments, the image processing device 10 may generate the virtual image 72 based on the FPN information 71 corresponding to the pixel value of the original image. The original image may mean an image before the FPN is corrected. For example, an illuminance (an original code) of a first pixel PX1 may be 400 LSB. The FPN information corresponding to the first pixel PX1 may be an FPN period having a period of six, a start point of the FPN of the second column (col #2), and an LSB slope of the FPN of 0.005 LSB, and the image processing device 10 may generate a pixel value corresponding to the first pixel PX1 as 2.0 LSB by multiplying the illuminance (original code) by the LSB slope of the FPN.

For example, an illuminance (an original code) of a second pixel PX2 may be 400 LSB. The FPN information corresponding to the second pixel PX2 may be an FPN period having a period of five, a start point of the FPN of the fourth column (col #4), and an LSB slope of the FPN of 0.002 LSB, and the image processing device 10 may multiply the illuminance (original code) by the LSB slope of the FPN to generate a pixel value corresponding to the second pixel PX2 as 0.8 LSB. An illuminance (an original code) of a third pixel PX3 may be 600 LSB.

The FPN information corresponding to the third pixel PX3 may be an FPN period having a period of six, a start point of the FPN of the second column (col #2), and an LSB slope of the FPN of 0.005 LSB, and the image processing device 10 may multiply the illuminance (original code) by the LSB slope of the FPN to generate a pixel value corresponding to the third pixel PX3 as 3.0 LSB. An illuminance (an original code) of a fourth pixel PX4 may be 200 LSB.

The FPN information corresponding to the fourth pixel PX4 may be an FPN period having a period of five, a start point of the FPN of the fourth column (col #4), and an LSB slope of the FPN of 0.002 LSB, and the image processing device 10 may multiply the illuminance (original code) by the LSB slope of the FPN to generate a pixel value corresponding to the fourth pixel PX4 as 0.4 LSB. The size of the virtual image may be the same as the size of the original image (e.g., the number of column lines (Image col #)×the number of row lines (Image row #)), and the image processing device 10 may generate pixel values of the virtual image based on FPN information corresponding to each pixel of the virtual image.

Figure 8:
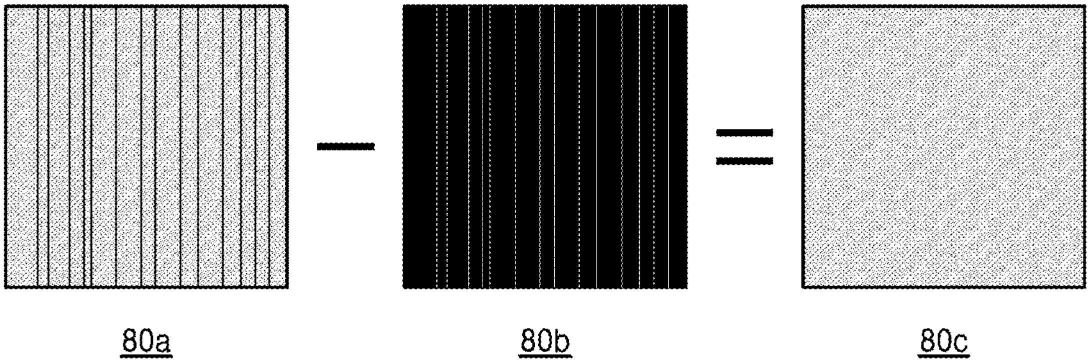
FIG. 8 is a diagram illustrating an example of an FPN correction operation in an image processing device according to some example embodiments.

FIG. 8 is a diagram illustrating an example of an FPN correction operation in an image processing device according to some example embodiments.

Referring to FIGS. 1 and 8, the image processing device 10 may generate a corrected image 80*c* by subtracting the virtual image 80*b* from the original image 80*a* having FPN. In some example embodiments, the original image 80*a* may include CFPN that appears periodically as a column line. The image processing device 10 may generate column FPN information using FFT based on the original image 80*a* and may generate a virtual image 80*b* based on column FPN information corresponding to the pixel value of the original image 80*a*. The image processing device 10 may generate, as 0 LSB, a value of a pixel without FPN information among pixels of the virtual image 80*b*. The image processing device 10 may generate a corrected image 80*c* by subtracting the pixel values of the virtual image 80*b* from each of the pixels of the original image 80*a*.

The corrected image 80*c* may be an image from which CFPN that appears periodically as a column line that is difficult to grasp with the naked eye is removed, and the image processing device 10 may solve the problem of image quality deterioration.

Figure 9:
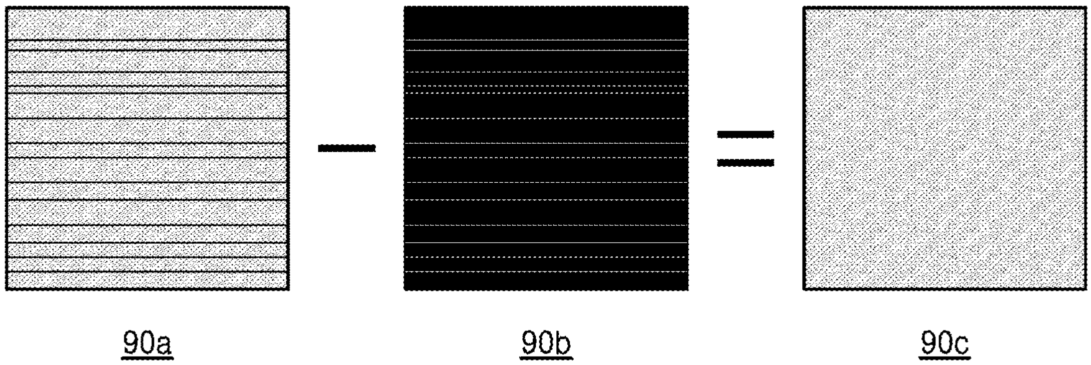
FIG. 9 is a diagram illustrating an example of an FPN correction operation in an image processing device according to some example embodiments.

FIG. 9 is a diagram illustrating an example of an FPN correction operation in an image processing device according to some example embodiments.

Referring to FIGS. 1 and 9, the image processing device 10 may generate a corrected image 90*c* by subtracting the virtual image 90*b* from the original image 90*a* having FPN. In some example embodiments, the original image 90*a* may include row FPN (RFPN) that periodically appears as a row line. The image processing device 10 may generate row FPN information using FFT based on the original image 90*a* and may generate a virtual image 90*b* based on column FPN information corresponding to the pixel value of the original image 90*a*. The image processing device 10 may generate, as 0 LSB, a value of a pixel without FPN information among pixels of the virtual image 90*b*. The image processing device 10 may generate a corrected image 90*c* by subtracting the pixel values of the virtual image 90*b* from each of the pixels of the original image 90*a*.

The corrected image 90*c* may be an image from which RFPN that appears periodically as a row line that is difficult to grasp with the naked eye is removed, and the image processing device 10 may solve the problem of image quality deterioration.

In some example embodiments, the original image may include CFPN periodically appearing as a column line and RFPN periodically appearing as a row line. The image processing device 10 may generate column FPN information and row FPN information using the method 40 described with reference to FIG. 4 and may correct the FPN using the column FPN information and the row FPN information. For example, the image processing device 10 may generate average images corresponding to each of the plurality of image groups by calculating the average values of column line pixel values of the plurality of images captured at the same illuminance and generate average images corresponding to each of the plurality of image groups by calculating the average values of row line pixel values of the plurality of images captured at the same illuminance. From the generated average images, the image processing device 10 may detect column FPN information and row FPN information using FFT. The image processing device 10 may correct the FPN by using the column FPN information and the row FPN information.

Figure 10:
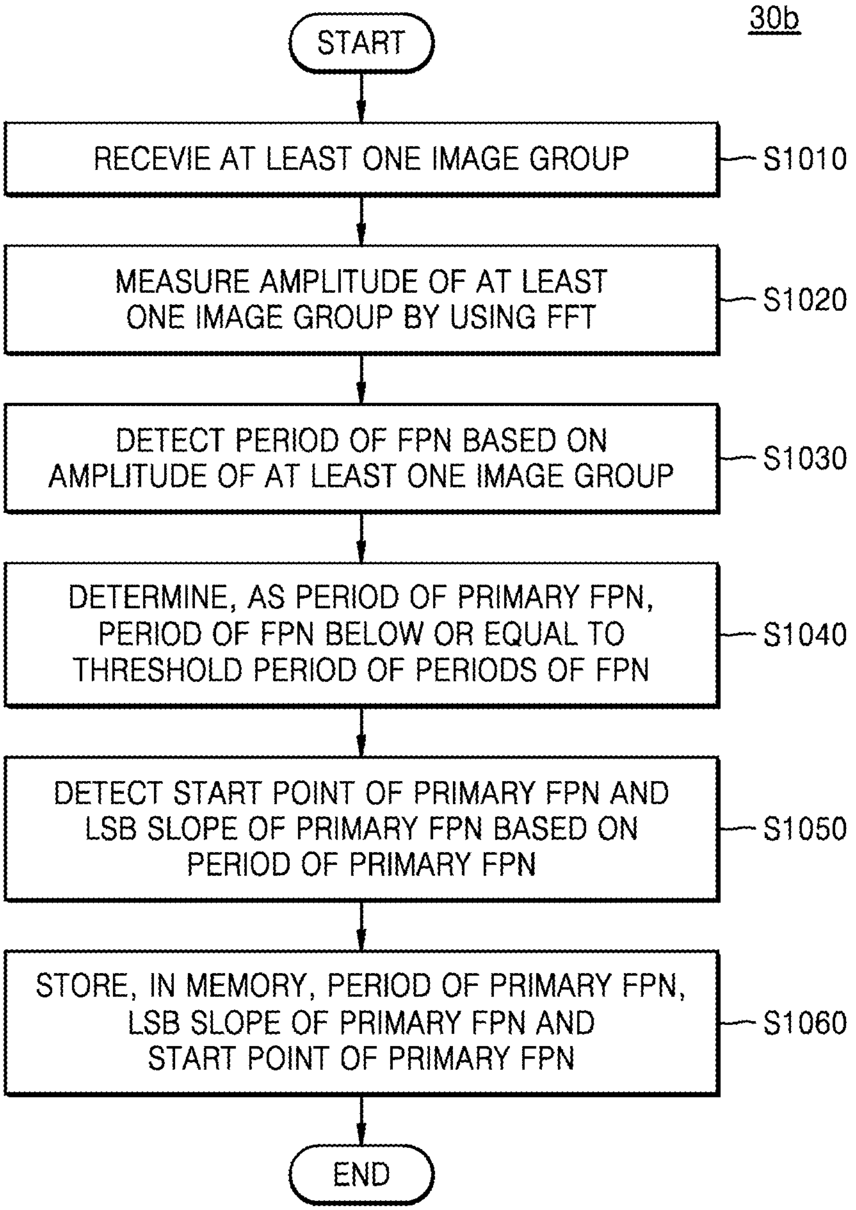
FIG. 10 is a flowchart illustrating an operating method of an image processing device, according to some example embodiments.

FIG. 10 is a flowchart illustrating an operating method of an image processing device, according to some example embodiments. As shown in FIG. 10, an operating method 30*b* of an image processing device may include a plurality of operations S1010 to S1060. The operating method 30*b* may be an example of the operating method 30*a* of FIG. 3.

Referring to FIGS. 1 and 10, in operation S1010, at least one image group may be received. In some example embodiments, the image sensor 100 may generate a plurality of images by capturing an object at illuminances at regular intervals and may generate at least one image group by grouping a plurality of images captured at the same illuminance into one group. The ISP 200 may receive at least one image group captured at illuminances at regular intervals from the image sensor 100.

In operation S1020, the amplitude of at least one image group may be measured using FFT. In some example embodiments, the ISP 200 may measure an amplitude of at least one image group using FFT.

In operation S1030, the period of the FPN may be detected based on the amplitude of at least one image group. In some example embodiments, the ISP 200 may not detect a frequency because the amplitude of the at least one image groups may not be measured when FPN does not occur and may detect a frequency because an amplitude of the at least one image group is measured when FPN occurs. The ISP 200 may detect the period of the FPN based on the detected frequency. For example, the ISP 200 may detect the period of the FPN based on the detected frequency using Equation 1.

In operation S1040, the period of the FPN below or equal to a threshold period among the periods of the FPN may be determined as the period of the primary FPN. According to some example embodiments, as the period of the FPN increases, the effect of the FPN on image quality may decrease, and the period of the primary FPN may be the period of the FPN having a relatively large effect on image quality. In some example embodiments, the ISP 200 may determine, as the period of the primary FPN, the period of the FPN below or equal to the threshold period among the periods of the FPN detected in operation S1030. The threshold period may be a preset, predetermined, desired, beneficial, and/or advantageous period.

In operation S1050, the start point of the primary FPN and the LSB slope of the primary FPN may be detected based on the period of the primary FPN. In some example embodiments, the ISP 200 may detect the LSB slope of the FPN based on the frequency used to detect the period of the primary FPN. For example, the ISP 200 may detect the LSB slope of the primary FPN using Equation 2 based on the amplitude at the frequency used to detect the period of the primary FPN.

In some example embodiments, the ISP 200 may detect a frequency at which the phase (Phase)/π of at least one image group is measured, and when the detected frequency is the same as the frequency used to detect the period of the primary FPN, the start point of the primary FPN may be detected based on the detected frequency.

In operation S1060, the period of the primary FPN, the LSB slope of the primary FPN, and the start point of the primary FPN may be stored in the memory. In some example embodiments, the ISP 200 may store, in the memory 300, the period of the primary FPN, the LSB slope of the primary FPN, and the start point of the primary FPN detected in operations S1040 and S1050. For example, when the detected FPN is column line-type FPN, the ISP 200 may store, in the memory 300, the period of the primary FPN, the LSB slope of the primary FPN, and the start point of the primary FPN, which are detected in response to the number of columns in the image. For example, when the detected FPN is row line-type FPN, the ISP 200 may store, in the memory 300, the period of the primary FPN, the LSB slope of the primary FPN, and the start point of the primary FPN, which are detected in response to the number of rows in the image.

Accordingly, in some example embodiments, since not all FPN information is stored in the memory 300, but only the primary FPN information is stored in the memory 300, the efficiency of the memory 300 may be improved, and the problem of image quality deterioration may be solved by determining FPN that has a relatively large effect on image quality as primary FPN.

Figure 11:
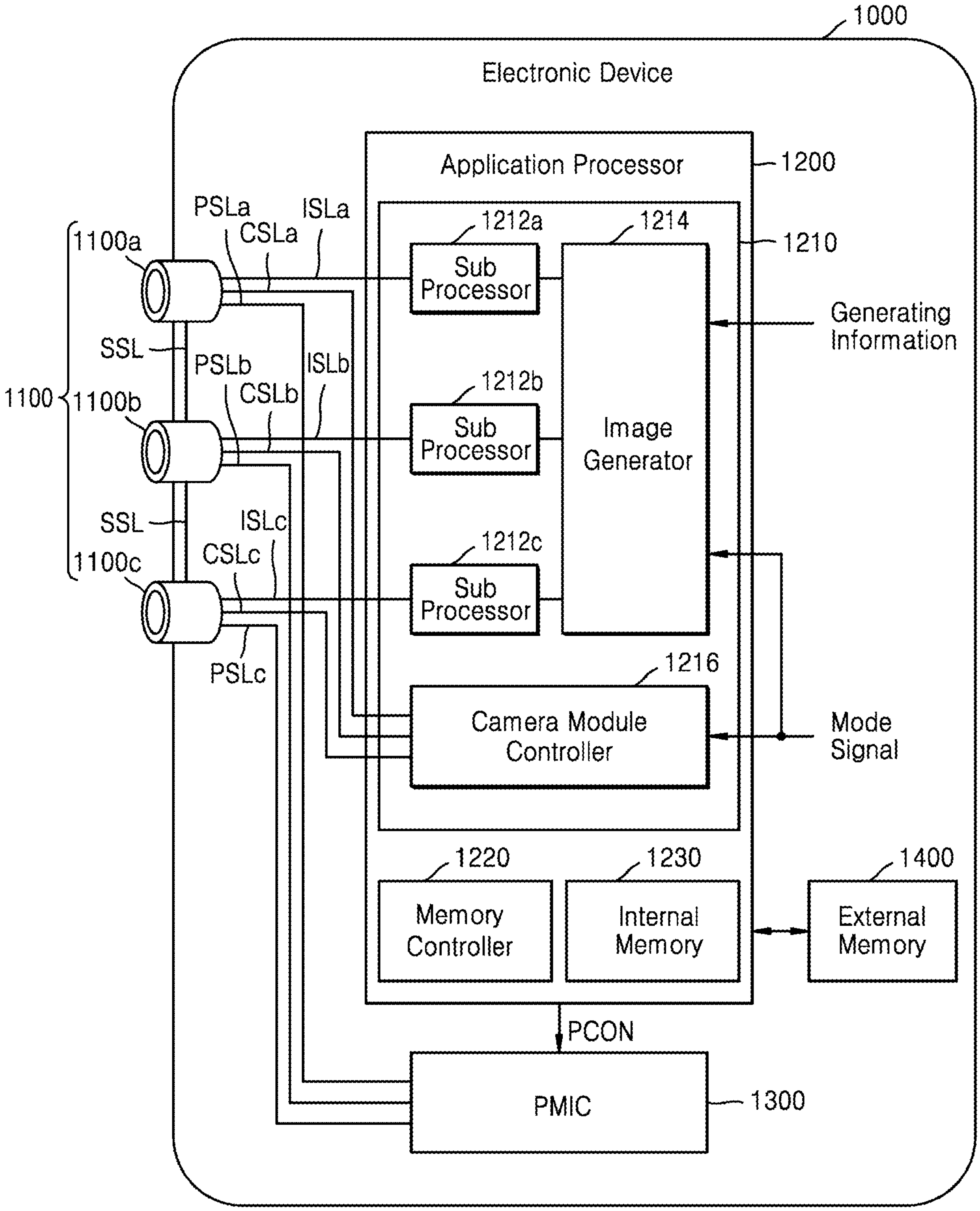
FIG. 11 is a block diagram illustrating an electronic device including a multi-camera module according to some example embodiments.

FIG. 11 is a block diagram illustrating an electronic device including a multi-camera module according to some example embodiments.

Referring to FIG. 11, an electronic device 1000 may include a camera module group 1100, an application processor 1200, a power management integrated circuit (PMIC) 1300, and an external memory 1400.

The camera module group 1100 may include a plurality of camera modules 1100*a*, 1100*b*, and 1100*c*. For example, the camera module group 1100 may be a camera sensor group 1100, and the plurality of camera modules 1100*a*, 1100*b*, and 1100*c* may be a plurality of camera sensors 1100*a*, 1100*b*, and 1100*c*. Although an example embodiment in which three camera modules 1100*a*, 1100*b*, and 1100*c* are arranged is illustrated in FIG. 11, example embodiments are not limited thereto. In some example embodiments, the camera module group 1100 may include only two camera modules, or may be modified to include n camera modules (n being a natural number of 4 or more).

The application processor 1200 may include an image processing device 1210, a memory controller 1220, and an internal memory 1230. The application processor 1200 may be implemented separately from the plurality of camera modules 1100*a*, 1100*b*, and 1100*c* and, for example, as a separate semiconductor chip.

The application processor 1200 may apply the features of the image processing device 10 or the ISP 200 described with reference to FIGS. 1 to 10. Alternatively, in some example embodiments the application processor 1200 may be configured to perform the operations of the image processing device 10 or the ISP 200. In some example embodiments, the application processor 1200 may receive image data captured for each illuminance from the camera module group 1100 and may group a plurality of pieces of image data into a plurality of image groups according to illuminance conditions. The application processor 1200 may generate a plurality of average images based on the plurality of image groups and may measure the amplitude and phase of each of the plurality of average images using FFT. The application processor 1200 may detect FPN information based on the amplitude and the phase may correct the FPN based on the detected FPN information.

The internal memory 1230 or the external memory 1400 may receive and store FPN information from the application processor 1200. The internal memory 1230 or the external memory 1400 may store FPN information to correspond to a column line or a row line. The memory controller 1220 may control an operation of the internal memory 1230. In some example embodiments, the internal memory 1230 or the external memory 1400 may each be a nonvolatile memory, such as a flash memory, a phase-change random access memory (PRAM), a magneto-resistive RAM (MRAM), a resistive RAM (ReRAM), or a ferro-electric RAM (FRAM), or a volatile memory, such as a static RAM (SRAM), a dynamic RAM (DRAM), or a synchronous DRAM (SDRAM).

Since the application processor 1200 may detect the FPN information using FFT, FPN correction may be performed based on the detected FPN information even for FPN that is difficult to grasp with the naked eye. Accordingly, it is possible to solve the problem of image quality deterioration.

The image processing device 1210 may include a plurality of sub-image processors 1212*a*, 1212*b*, and 1212*c*, an image generator 1214, and a camera module controller 1216. In some example embodiments, each of the sub-image processors 1212*a*, 1212*b*, and 1212*c* may be processing circuitry that may include a non-transitory computer readable storage device (e.g., a memory), for example a solid state drive (SSD), storing a program of instructions, and a processor (e.g., CPU) configured to execute the program of instructions.

The image processing device 1210 may include the plurality of sub-image processors 1212*a*, 1212*b*, and 1212*c* corresponding to the number of the plurality of camera modules 1100*a*, 1100*b*, and 1100*c*.

The camera module controller 1216 may provide a control signal to each of the camera modules 1100*a*, 1100*b*, and 1100*c*. The control signal generated from the camera module controller 1216 may be provided to the corresponding camera modules 1100*a*, 1100*b*, and 1100*c* through control signal lines CSLa, CSLb, and CSLc separated from each other.

Image data generated from the camera module 1100*a* may be provided to the sub-image processor 1212*a* through an image signal line ISLa, image data generated from the camera module 1100*b* may be provided to the sub-image processor 1212*b* through an image signal line ISLb, and image data generated from the camera module 1100*c* may be provided to the sub-image processor 1212*c* through an image signal line ISLc. In some example embodiments, the image data transmission may be performed using, for example, a camera serial interface (CSI) based on a mobile industry processor interface (MIPI), but example embodiments are not limited thereto.

Each of the sub-image processors 1212*a*, 1212*b*, and 1212*c* may perform image processing such as bad pixel correction, auto-focus correction, auto-white balance, and auto-exposure called 3 auto (3A) control, noise reduction, sharpening, gamma control, and remosaic on image data provided from the camera modules 1100*a*, 1100*b*, and 1100*c*, but example embodiments are not limited thereto.

In some example embodiments, the remosaic signal processing may be performed in each of the camera modules 1100*a*, 1100*b*, and 1100*c* and then provided or sent to the sub-image processors 1212*a*, 1212*b*, and 1212*c*.

In some example embodiments, image data processed by each of the sub-image processors 1212*a*, 1212*b*, and 1212*c* may be provided or sent to the image generator 1214. The image generator 1214 may generate an output image by using image data provided or received from each of the sub-image processors 1212*a*, 1212*b*, and 1212*c* according to image generation information or a mode signal.

For example, the image generator 1214 may generate an output image by merging at least some pieces of the image data generated from the sub-image processors 1212*a*, 1212*b*, and 1212*c* according to image generation information or a mode signal. In some example embodiments, the image generator 1214 may generate an output image by selecting any one piece of image data generated by the sub-image processors 1212*a*, 1212*b*, and 1212*c* according to image generation information or a mode signal.

In some example embodiments, the image generation information may include a zoom signal or a zoom factor. In some example embodiments, the mode signal may be, for example, a signal based on a mode selected by a user.

In some example embodiments, when the image generation information is a zoom signal (zoom factor), and each of the camera modules 1100*a*, 1100*b*, and 1100*c* has different fields of view (view angles), the image generator 1214 may perform different operations according to the type of the zoom signal. For example, when the zoom signal is a first signal, an output image may be generated by using image data output from the sub-image processor 1212*a* and image data output from the sub-image processor 1212*b* among image data output from the sub-image processor 1212*a* and image data output from the sub-image processor 1212*c*. If the zoom signal is a second signal that is different from the first signal, the image generator 1214 may generate an output image by using image data output from the sub-image processor 1212*c* and image data output from the sub-image processor 1212*b* among image data output from the sub-image processor 1212*a* and image data output from the sub-image processor 1212*c*. If the zoom signal is a third signal that is different from the first and second signals, the image generator 1214 may generate an output image by selecting any one piece of the image data output from each of the sub-image processors 1212*a*, 1212*b*, and 1212*c* without performing such image data merging. However, example embodiments are not limited thereto, and a method of processing image data as necessary, desired, or advantageous may be modified and implemented.

Figure 12:
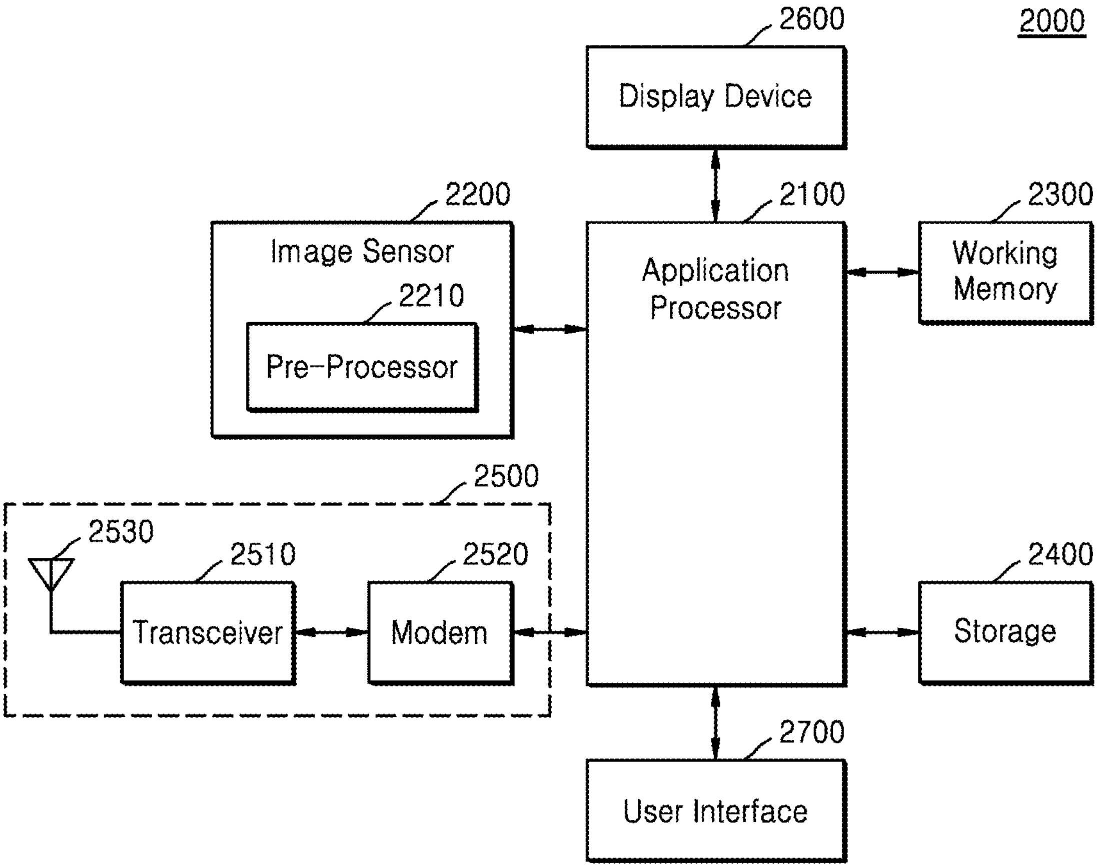
FIG. 12 is a block diagram illustrating an image processing system according to some example embodiments.

FIG. 12 is a block diagram illustrating an image processing system according to some example embodiments. In some example embodiments, an electronic device 2000 of FIG. 12 may be a portable terminal, but example embodiments are not limited thereto.

Referring to FIG. 12, the electronic device 2000 may include an application processor 2100, an image sensor 2200, a working memory 2300, a storage 2400, a display device 2600, a user interface 2700, and a wireless transmission/reception unit 2500.

The application processor 2100 may be implemented as a system-on-chip (SoC) that controls the overall operation of the electronic device 2000 and drives an application program, an OS, and the like. The application processor 2100 may provide or send image data provided or received from the image sensor 2200 to the display device 2600 or store the image data in the storage 2400.

The application processor 2100 may apply the features of the image processing device 10 or the ISP 200 described with reference to FIGS. 1 to 10. In some example embodiments, the application processor 2100 may receive image data captured for each illuminance from the image sensor 2200 and may group a plurality of image data into a plurality of image groups according to illuminance conditions. The application processor 2100 may generate a plurality of average images based on the plurality of image groups and may measure the amplitude and phase of each of the plurality of average images using FFT. The application processor 2100 may detect FPN information based on the amplitude and the phase and may correct the FPN based on the detected FPN information.

The working memory 2300 may be implemented as a volatile memory such as DRAM or SRAM or a nonvolatile resistive memory such as FeRAM, RRAM, or PRAM. The working memory 2300 may store programs and/or data processed or executed by the application processor 2100.

The working memory 2300 may receive and store FPN information from the application processor 2100. The working memory 2300 may store FPN information so as to correspond to a column line or a row line.

The storage 2400 may be implemented as a nonvolatile memory device such as a NAND flash or a resistive memory, and for example, the storage 2400 may be provided as a memory card such as a multi-media card (MMC), an embedded multi-media card (eMMC), a secure digital (SD) card, a micro SD card, or the like. The storage 2400 may store image data received from the image sensor 2200 or data processed or generated by the application processor 2100.

The user interface 2700 may be implemented as various devices capable of receiving a user input, such as a keyboard, a curtain key panel, a touch panel, a fingerprint sensor, and a microphone, but example embodiments are not limited thereto. The user interface 2700 may receive a user input and provide or send a signal corresponding to the received user input to the application processor 2100.

The wireless transmission/reception unit 2500 may include a transceiver 2510, a modem 2520, and an antenna 2530.

While the present inventive concepts have been particularly shown and described with reference to some example embodiments thereof, it will be understood that various changes in form and details may be made therein without departing from the spirit and scope of the following claims.

What is claimed is:

1. An operating method of an image processing device, the operating method comprising:

receiving at least one image group including a plurality of images;

detecting, from the at least one image group, fixed pattern noise (FPN) information using Fast Fourier Transform (FFT); and correcting FPN of an original image generated by an image sensor based on the FPN information, wherein detecting the FPN information comprises:

generating average images corresponding to the at least one image group based on average values of pixel values of the plurality of images included in each of the at least one image group; and detecting, from the average images, the FPN information using the FFT.

2. The operating method of claim 1, wherein the generating the average images comprises generating the average images based on average values for column line pixel values or row line pixel values of the plurality of images included in each of the at least one image group.

3. The operating method of claim 1, wherein the FPN information comprises a period of the FPN, a start point of the FPN, and a least significant bit (LSB) slope of the FPN.

4. The operating method of claim 3, wherein the detecting, from the average images, the FPN information using the FFT comprises:

measuring an amplitude of each of the average images using the FFT; and detecting the period of the FPN and the LSB slope of the FPN based on the amplitude of each of the average images.

5. The operating method of claim 4, wherein the detecting, from the average images, the FPN information using the FFT further comprises:

measuring a phase of each of the average images by using the FFT; and detecting the start point of the FPN based on the phase of each of the average images.

6. The operating method of claim 1, wherein the FPN information comprises column FPN information and row FPN information, the detecting, from the at least one image group, the FPN information comprises generating a column average image based on average values for column line pixel values of the plurality of images;

generating a row average image based on average values of row line pixel values of the plurality of images; and detecting, from the column average image and the row average image, the column FPN information and the row FPN information using the FFT, and the correcting the FPN based on the FPN information comprises correcting the FPN based on the column FPN information and the row FPN information.

7. The operating method of claim 1, wherein the correcting the FPN based on the FPN information comprises:

generating a virtual image based on the FPN information; and correcting the FPN by subtracting the virtual image from the original image.

8. The operating method of claim 1, wherein the FPN information comprises a period of a primary FPN, a start point of the primary FPN, and an LSB slope of the primary FPN, and the detecting the FPN information comprises:

measuring an amplitude of the at least one image group using the FFT;

detecting a period of the FPN based on the amplitude of the at least one image group;

determining, as the period of the primary FPN, a period of the FPN, that is less than or equal to a threshold period, in the period of the FPN; and detecting the start point of the primary FPN and a least significant bit (LSB) slope of the primary FPN based on the period of the primary FPN.

9. The operating method of claim 1, wherein the at least one image group comprises two or more image groups captured at different illuminances at regular intervals.

10. An image processing device, comprising:

an image sensor configured to output image data; and an image signal processor configured to group the image data into at least one image group based on illuminance conditions, detect, based on the at least one image group, fixed pattern noise (FPN) information using Fast Fourier Transform (FFT), and correct the FPN based on the FPN information, wherein the FPN information comprises a period of the FPN, a start point of the FPN, and a least significant bit (LSB) slope of the FPN.

11. The image processing device of claim 10, wherein the image signal processor is configured to:

measure an amplitude and a phase of the at least one image group using the FFT;

detect the period of the FPN and the LSB slope of the FPN based on the amplitude of the at least one image group; and detect the start point of the FPN based on the phase of the at least one image group.

12. The image processing device of claim 10, further comprising a memory for storing the FPN information, wherein the image signal processor is configured to:

generate a virtual image based on the FPN information; and correct the FPN by subtracting the virtual image from an original image generated by the image sensor.

13. The image processing device of claim 12, wherein the memory stores the FPN information to correspond to a number of columns or rows.

14. The image processing device of claim 10, wherein the illuminance conditions includes an illuminance of an interval.

15. An image processing system, comprising:

an image sensor configured to output image data;

an application processor configured to group the image data into a plurality of image groups according to illuminance conditions, generate a plurality of average images corresponding to each of the plurality of image groups, measure an amplitude and phase of each of the plurality of average images using Fast Fourier Transform (FFT), detect fixed pattern noise (FPN) information based on the amplitude and phase of each of the plurality of average images, correct FPN based on the FPN information; and a memory configured to store data therein.

16. The image processing system of claim 15, wherein the FPN information comprises a period of the FPN, a start point of the FPN, and a least significant bit (LSB) slope of the FPN.

17. The image processing system of claim 15, wherein the application processor is configured to:

generate a virtual image based on the FPN information; and correct the FPN by subtracting the virtual image from an original image generated by the image sensor.

18. The image processing system of claim 15, wherein the memory is configured to store the FPN information to correspond to a number of columns or rows.

* * * * *